United States Patent Office 2,829,162
Patented Apr. 1, 1958

2,829,162

PREPARATION OF DIPOTASSIUM GLUTAMATE

Ingmar Sollin, Morton Grove, Ill., assignor to International Minerals & Chemical Corporation, a corporation of New York No Drawing. Application February 29, 1956
Serial No. 568,439

7 Claims. (Cl. 260—534)

This invention relates to the preparation of dipotassium glutamate and more particularly, to the preparation of dipotassium glutamate by a commercially feasible process.

Dispotassium glutamate has not been heretofore prepared although disodium glutamate is well-known to the art. Disodium glutamate may be prepared by simply reacting glutamic acid with sodium hydroxide in an aqueous mixture in the absence of carbon dioxide and distilling off the water at low pressures. Disodium glutamate remains as the residue. It is impossible to prepare dipotassium glutamate by this procedure.

Disodium glutamate, although simple to prepare, is an undesirable form in which to administer glutamic acid to certain patients, particularly those who have low sodium diets. Dipotassium glutamate is eminently satisfactory for treating such patients and provides a means for simultaneously administering physiologic amounts of potassium and glutamic acid.

It is an object of this invention to prepare crystalline dipotassium glutamate.

It is another object of this invention to prepare dipotassium glutamate in high yields by a commercially feasible process.

It is another object of this invention to prepare dipotassium glutamate in an aqueous medium.

In accordance with this invention, glutamic acid is treated with potassium hydroxide in aqueous solution in the absence of carbonate ions and dipotassium glutamate is recovered from the reaction product mixture. Potassium hydroxide must be present in the reaction mixture in an amount of at least twice the chemical equivalent of the quantity of glutamic acid present. Dipotassium glutamate is recovered from the reaction product mixture by azeotroping the water from the mixture in the absence of carbon dioxide or carbonate ions.

By the terms dipotassium glutamate, mono-potassium glutamate, and glutamic acid as used herein is meant either the L- or D-optically active forms or the racemic DL-form of these compounds. Treatment of L-glutamic acid with at least two equivalent weights of potassium hydroxide or treatment of L-mono-potassium glutamate with at least one equivalent weight of potassium hydroxide in accordance with this invention produces L-dipotassium glutamate if racemization temperatures are avoided. D-dipotassium glutamate is produced from D-glutamic acid or D-mono-potassium glutamate and DL-dipotassium glutamate is prepared from DL-glutamic acid or DL-mono-potassium glutamate under the same respective conditions. DL-dipotassium glutamate may also be prepared from D- or L-glutamic acid or D- or L-mono-potassium glutamate by treatment with potassium hydroxide under the same condition, but at temperatures above the racemization temperature.

In carrying out the present invention, potassium hydroxide is present in the reaction mixture in an amount of about 2 equivalent weights based on the amount of glutamic acid present. Larger amounts of potassium hydroxide tend to result in destruction of some of the glutamic acid present with a lowering of dipotassium glutamate yields. Use of smaller amounts of potassium hydroxide also results in a reduced yield of dipotassium glutamate.

It is essential that the entire reaction be carried out in the absence of carbon dioxide. Thus, there must be no carbon dioxide in the atmosphere above the reaction solution nor dissolved in the reaction solution, and the latter solution must be free of carbonate ions. In order to insure that no carbon dioxide will contaminate the reaction mixture, the reaction vessel should be freed of carbon dioxide, preferably by sparging with a carbon dioxide-free gas prior to adding the reagents. Air, from which carbon dioxide has been removed, or an inert gas such as nitrogen may be used. Care should be taken also to keep the reagents free from carbon dioxide.

Following completion of the reaction, an azeotroping agent for water, such as n-butanol, is added to the reaction product mixture and the mixture refluxed until all water is removed from the reaction product. Water may be azeotroped from the reaction product at any suitable pressure, but it is preferable to use atmospheric pressure. The azeotroping agent utilized may be any suitable organic solvent which does not react with dipotassium glutamate and which forms an azeotrope with water. The azeotroping agent should preferably be more miscible with water at elevated temperatures than at lower temperatures. Representative azeotroping agents useful in this invention include alcohols containing at least 4 carbon atoms, for example, n-butyl alcohol, isobutyl alcohol, sec-butyl alcohol, n-amyl alcohol, isoamyl alcohol, sec-amyl alcohol, tert-amyl alcohol, n-hexyl alcohol and the isomers of n-hexyl alcohol, n-heptyl alcohol and its isomers. Also included are ethers containing at least 4 carbon atoms such as diethyl ether, dipropyl ether, dibutyl ether, diisobutyl ether, diamyl ether, diisoamyl ether and the like. It is not necesssary that the ethers be symmetrical because unsymmetrical ethers such as ethyl-propyl ether, methyl-propyl ether, methyl-butyl ether, ethylbutyl ether, propyl-butyl ether and similar ethers having a higher number of carbon atoms may also be utilized.

During the azeotroping of water from the reaction product mixture, it is essential that no carbon dioxide or carbonate ions be allowed to enter the system. Following the removal of substantially all water from the dipotassium glutamate reaction product mixture, the residue comprising a mixture of crystalline dipotassium glutamate and azeotroping agent, for example, n-butanol, is allowed to cool. The crystalline dipotassium glutamate may be separated from the azeotroping agent by any convenient means as, for example, by filtration. The crystals are then washed with additional azeotroping agent and dried under vacuum in the absence of carbon dioxide or carbonate ions. Because crystalline dipotassium glutamate is extremely hygroscopic, it must be stored in a moisture-free atmosphere.

The reaction of the process of this invention may be carried out at any temperature below the racemization temperature of L- or D-glutamic acid. Obviously, however, if DL-dipotassium glutamate is desired, higher temperatures may be utilized and in this case the starting material may be D- or L- or DL-glutamic acid. In the preparation of D- or L-dipotassium glutamate from the corresponding optically active form of glutamic acid, it is preferred to carry out the concentration of the reaction solution at a temperature between about 20° C. and about 110° C. Within this temperature range the evaporation proceeds expeditiously and the danger of racemization is absent.

The term "absence of carbon dioxide" as it is used in the specification and claims will be understood to include the absence of carbonate ions in the reaction mixture and refers to conditions which exclude the addition of carbon dioxide or carbonate ions to the reaction mixture.

According to one embodiment of the invention, a carbon dioxide-free aqueous solution of potassium hydroxide is prepared and L-glutamic acid is dissolved in the solution. A convenient method for preparing the carbon dioxide-free potassium hydroxide solution involves first preparing a saturated solution of potassium hydroxide, for example, about a 50% potassium hydroxide solution at room temperature. Any carbon dioxide present in the saturated potassium hydroxide solution precipitates as potassium carbonate and may be removed by any convenient means, for example, by filtration. The carbon dioxide-free potassium hydroxide solution is then diluted with carbon dioxide-free water to a convenient concentration, for example, to a molarity with respect to potassium hydroxide of between about 5 and about 15. L-glutamic acid is added to the diluted potassium hydroxide solution in an amount of not more than one-half the equivalent weight of the potassium hydroxide in solution. Addition of the L-glutamic acid is carried out in a manner to exclude the entrance of carbon dioxide to the reaction vessel. Sufficient water is added to the mixture to permit dissolution of the L-glutamic acid at a temperature below the racemization temperature.

Following dissolution of L-glutamic acid, n-butanol in the amount of about six parts per part of water in the reaction product mixture is added to the reaction product mixture and the mixture refluxed at atmospheric pressure until no more water separates. The azeotroping apparatus is preferably arranged in a manner which will permit condensation of the water-n-butanol vapors, separation of n-butanol from the water and return of the n-butanol to the reaction mixture. Refluxing is continued until substantially entirely all water is removed from the reaction product mixture, leaving as a residue a mixture of crystalline dipotassium glutamate and n-butanol from which the crystalline dipotassium glutamate may be removed by cooling the mixture and then filtering. The crystals are washed with n-butanol and then ethyl ether and dried under a vacuum. Care is taken to maintain the crystals free from carbon dioxide.

The following examples illustrate specific embodiments of this invention. All parts are by weight unless otherwise indicated:

EXAMPLE I

DL-glutamic acid monohydrate in the amount of about 165.1 parts was placed in a reaction vessel which had been sparged with nitrogen and 280.5 parts of 9.9 normal potassium hydroxide, which was free from carbon dioxide, was added under a nitrogen atmosphere. A slightly exothermic reaction took place and the DL-glutamic acid monohydrate was dissolved completely. n-Butanol in the amount of 1012.5 parts was then added to the reaction product mixture and the mixture refluxed at atmospheric pressure until substantially entirely all water had been removed from the reaction product mixture. The apparatus was arranged in a manner whereby the water-n-butanol azeotrope vapors were condensed, n-butanol separated from the water and the n-butanol was returned to the refluxed mixture while the water was discarded. Following separation of water from the reaction product mixture, the residue comprising crystalline DL-dipotassium glutamate-n-butanol mixture was cooled and filtered with precautions being taken to exclude atmospheric moisture and carbon dioxide. The crystalline DL-dipotassium glutamate thus recovered was washed with n-butanol and ether and dried under vacuum. The crystalline product had the analysis shown in Table I, where "DC-GA" refers to glutamic acid content, determined by the glutamic acid decarboxylase method of Umbreit and Gunsalus (J. Biol. Chem., 159 (1945), p. 333).

Table I
PHYSICAL AND CHEMICAL CONSTANTS OF DL-K$_2$ GA

| | Found | Theory for DL-K$_2$ GA.H$_2$O |
|---|---|---|
| Total nitrogen_____percent__ | 5.89 | 5.81 |
| Sulfated ash_____do____ | 33.89 | 32.36 |
| Titration_____do____ | 99.4 | 100.0 |
| DC-GA_____do____ | 32.1 | 30.5 |
| Melting point_____ | (¹) | (¹) |

¹ Becomes glassy at 120° C. with decomposition at 170° C. +.

EXAMPLE II

L-dipotassium glutamate was prepared in accordance with the procedure of Example I with the exception that L-glutamic acid was utilized in place of DL-glutamic acid. L-dipotassium glutamate was recovered in a yield of about 96% of the theoretical based upon the quantity of glutamic acid starting material. The crystalline L-dipotassium glutamate had the analysis shown in Table II.

Table II
PHYSICAL AND CHEMICAL CONSTANTS OF L-K$_2$ GA

| | Found | Theory for L-K$_2$ GA.H$_2$O |
|---|---|---|
| Total nitrogen_____percent__ | 5.71 | 5.81 |
| Sulfated ash_____do____ | 32.73 | 32.36 |
| Titration_____do____ | 96.4 | 100.0 |
| DC-GA_____do____ | 60.8 | 61.0 |
| Amino nitrogen_____do____ | 99.0 | 100.0 |
| Melting point_____ | (¹) | (¹) |

¹ 180–190° C. with decomposition.

Having thus fully described and illustrated the character of the instant invention, what is desired to be secured by Letters Patent is:

1. A process for producing dipotassium glutamate which comprises treating glutamic acid with about two equivalent weights of potassium hydroxide while maintaining the reaction mixture free from carbon dioxide and carbonate ions, removing substantially all water from the reaction product mixture by azeotropic distillation with an organic solvent which forms an azeotrope with water and which does not react with dipotassium glutamate, and separating crystalline dipotassium glutamate from the distillation residue.

2. A process for producing dipotassium glutamate which comprises treating glutamic acid with about two equivalent weights of potassium hydroxide while maintaining the reaction mixture free from carbon dioxide and carbonate ions, adding n-butanol to the reaction mixture, boiling the resulting mixture until substantially all water is removed therefrom and separating crystalline dipotassium glutamate from the distillation residue.

3. The process of claim 2 in which glutamic acid and potassium hydroxide are reacted in stoichiometric amounts.

4. A process for producing L-dipotassium glutamate which comprises treating L-glutamic acid with about two equivalent weights of potassium hydroxide while maintaining the reaction mixture free from carbon dioxide and carbonate ions, removing substantially all water from the reaction product mixture by azeotropic distillation with an organic solvent which forms an azeotrope with water and which does not react with dipotassium glutamate, and separating crystalline L-dipotassium glutamate from the distillation residue.

5. A process for producing L-dipotassium glutamate which comprises treating L-glutamic acid with about two equivalent weights of potassium hydroxide while maintaining the reaction mixture free from carbon dioxide and carbonate ions, adding n-butanol to the reaction mixture, boiling the resultant mixture until substantially all water is removed therefrom and separating crystalline L-dipotassium glutamate from the distillation residue.

6. A process as in claim 5 in which L-dipotassium glutamate is crystallized and separated from the distillation residue.

7. A process as in claim 5 in which L-dipotassium glutamate is crystallized and separated from the distillation residue and in which the reaction temperature is between about 20° C. and about 110° C.

References Cited in the file of this patent

UNITED STATES PATENTS 2,306,646    Shildneck  ---------------- Dec. 29, 1942

FOREIGN PATENTS 825,549    Germany  ---------------- Dec. 20, 1951

OTHER REFERENCES

Ogawa: Chem. Abs., vol. 46 (1952), col. 526.